United States Patent [19]
Walker

[11] Patent Number: 5,335,168
[45] Date of Patent: Aug. 2, 1994

[54] COMPUTER SYSTEM WITH POWER-DOWN MODE FOR MONITOR

[75] Inventor: Richard E. Walker, The Woodlands, Tex.

[73] Assignee: Compaq Computer Corporation, Houston, Tex.

[21] Appl. No.: 4,144

[22] Filed: Jan. 13, 1993

[51] Int. Cl.$^5$ .............................................. G06F 1/00
[52] U.S. Cl. .................................. 364/707; 364/242; 364/273; 364/DIG. 1
[58] Field of Search ............... 395/750; 364/231, 242, 364/273.1, 707

[56] References Cited
U.S. PATENT DOCUMENTS

| | | | |
|---|---|---|---|
| 4,980,836 | 12/1990 | Carter | 364/483 |
| 5,021,983 | 6/1991 | Nguyen et al. | 364/707 |
| 5,167,024 | 11/1992 | Smith et al. | 364/273.1 |
| 5,237,692 | 8/1993 | Raash et al. | 364/273.1 |

OTHER PUBLICATIONS

PC Week Feb. 11, 1991 v8 n6 p. 5(1) PS/2 L40SX packs design novelties . . . author Michael Caton.
EDGE: Work–Group Computing Report Mar. 18, 1991 v2 n43 p. 28(1) Notebook displays . . . author Phoenix Technologies Ltd (Product Anouncement).
PC Computing, Oct. 1993 p. 297 Nanao USA Corporation.
NUTEK Specification 803299/92–93, Dec. 3, 1992, pp. 1–2.
"Auto turn-off monitors," Nutek, 1992, pp. 1–4.
"Environmental Labelling of Display Units," Presented at Third International Scientific Conference, Sep. 1992, pp. 1–4.

Primary Examiner—Jack B. Harvey
Assistant Examiner—Craig Steven Miller
Attorney, Agent, or Firm—L. Jon Lindsay

[57] ABSTRACT

A computer system has a monitor which can be powered down to conserve electrical power. The Monitor has two power modes, normal power mode and low power mode. Upon receiving a signal from the CPU, the monitor switches between power modes.

14 Claims, 2 Drawing Sheets

Fig. 1
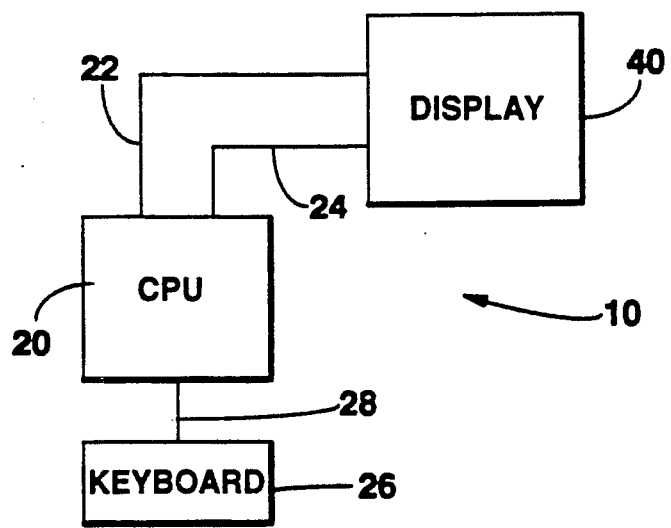
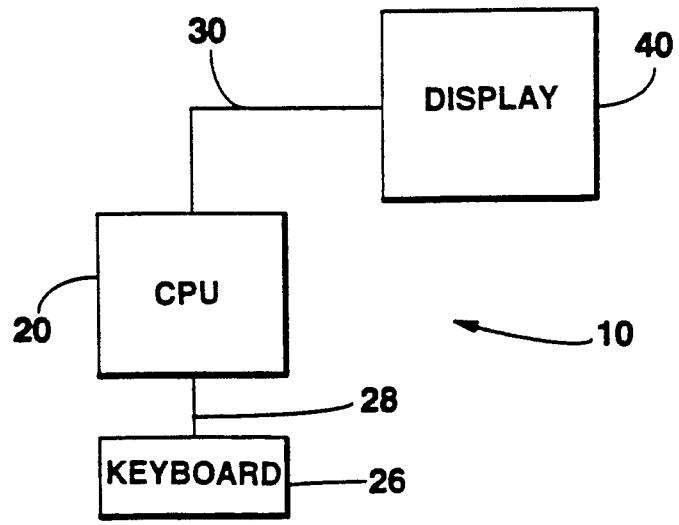
Fig. 2

COMPUTER SYSTEM WITH POWER-DOWN MODE FOR MONITOR

BACKGROUND OF THE INVENTION

This invention relates to power management and power conservation techniques for personal computers. More particularly, this invention relates to power conservation in the monitor of a personal computer system.

In recent years, power management features in personal computers have come into more and more common use, particularly in the very small, battery operated notebook computers. An example of an apparatus for reducing power consumption in a computer system is shown in U.S. Pat. No. 4,980,836, which is assigned to the assignee of the present invention and incorporated herein by reference. This apparatus shuts down part of the computer system after a period of inactivity, thus conserving electrical power.

Other ways of reducing power consumption may involve turning off, or slowing down, only certain internal peripheral devices, such as the hard drive. Usually, these methods monitor activity to the peripheral device and, after a certain period of inactivity, shut the peripheral down. Typical power conservation for powering down a hard drive may result in approximately a three percent reduction in power usage by the entire computer system.

In most personal computer systems, the monitor is one of the biggest users of power. However, no one has yet found a way to provide power management features in a computer monitor such as the cathode ray tube (CRT) monitors commonly used with most desk top personal computers. These monitors are turned on all the time the computer is in use and draw full power the entire time. In a typical system, the monitor may consume three-fourths of all the power. Therefore, considerable power savings may be had if some way to power down the monitor could be accomplished.

In a typical CRT monitor, a filament produces electrons when it becomes very hot. A series of grids and anodes strips the electrons from the filament, accelerates the electrons into a beam and focuses the beam onto a phosphorescent screen. A set of coils deflects the beam onto different areas of the screen to produce an image. The filament, the grids and a first anode form an electron gun. A first grid modulates the number of electrons in the electron beam. A second grid accelerates the electrons through the electron gun. A third grid focuses the electron beam very tightly. The first anode accelerates the electrons even more before they leave the electron gun. Then the coils deflect the beam in the horizontal and vertical directions. Finally, a second anode, a very high voltage device, accelerates the beam a final time before the electrons strike the phosphors on the screen causing an emission of photons. Control circuitry provides the control signals to synchronize the operation of each of these elements so that an image appears on the screen. The deflection coils and the second anode are by far the biggest drain on the power supply.

When a user turns on a monitor, there is usually a several second delay before an image appears on the screen. This delay is due to the need to heat up the heating filament of the electron gun. Although, the deflection coils and the second anode draw the most power, they can be turned on much more quickly than can the heating element. The monitor's control circuitry and the electron gun, except for the filament, can also be turned on very quickly. Therefore, the limiting factor in turning on a monitor is the time needed to heat up the heating filament.

Additionally, the limiting factor in the useful life of a CRT monitor is usually the heating filament. In other words, keeping the filament hot will eventually cause the filament to wear out, usually before the other elements of the monitor wear out. The ratio of the life of the filament to its temperature is governed by the root mean square distribution. Thus, an increase in the life of a filament will not be linearly proportional to a reduction in the temperature of the filament. Instead, the increase in the life of the filament will be proportional to the square of the reduction in its temperature, so a relatively small change in the temperature of the filament will result in a relatively large change in its useful life. Also, the ratio of the change in voltage across the filament to the change in temperature of the filament is governed by the root mean square distribution. In this case, the change in voltage is proportional to the square of the change in temperature. Therefore, a reduction in the voltage across the filament will result in a relatively small reduction in the temperature of the filament, which will result in a relatively large increase in its useful life.

Televisions made several years ago powered down every part of the television system when the television was turned off. Then when the television was turned on, several seconds would pass before an image would appear on the screen, because the system had to wait for the heating element to heat up. However, most televisions made today only require a short wait before an image appears. This short time period is due to the fact that most televisions no longer power down every element of the system when the television is turned off. Instead, the new televisions keep the heating element hot even when the system is off. Thus, if a person were to touch the back of a modern television, that person would find the television to be quite warm even though it had been left off for several hours.

Many screen-saver programs already exist for personal computers. These programs usually remove the image on the screen of the monitor after a period of user inactivity and replace the image with a moving image that will not "burn" into screen. One type of screen-saver blanks the screen entirely, so that there is no image at all. When the user touches a key on the keyboard or moves a mouse pointer, thus resuming activity, the previous image is restored to the screen. However, screen-saver programs do not actually conserve any power in the system. Instead, all of the elements of the monitor remain under full power, even if the screen has been completely blanked out.

Therefore, it is an object of the present invention to provide a power management feature for a personal computer system by powering down selected parts of the system's monitor.

BRIEF SUMMARY OF THE INVENTION

It is an object of the present invention to provide a computer system capable of reducing the power consumption of its display device.

It is a further object to provide a computer display device having a reduced power mode for conserving electrical power.

A standard CRT monitor has several elements that consume power. The present invention powers down some or all of these elements in order to conserve power.

The primary elements of a standard CRT monitor for a computer system include a heating filament, control circuitry, a modulator grid, an accelerator grid, a focusing grid, a first accelerating anode, a second accelerating anode, and deflection coils. The invention changes the monitor's power consumption from a normal power mode to a low power mode by turning off the power to all of these elements except the heating filament. The power to the heating filament may remain fully on or slightly reduced.

The computer system sends signals to the monitor to enter the low power mode and subsequently to resume the normal power mode. The signal to enter the low power mode is generated after a period of user inactivity. Thus, the invention monitors the time from the last input from the user through any input device. The signal to resume the normal power mode, on the other hand, is generated by any user activity through any input device.

DESCRIPTION OF THE DRAWINGS

FIG. 1 is a block diagram of a computer system with separate on/off signal wires, FIG. 2 is a block diagram of a computer system with the on/off signals encoded in the video signals.

DETAILED DESCRIPTION OF THE PREFERRED EMBODIMENTS

Figure 3:
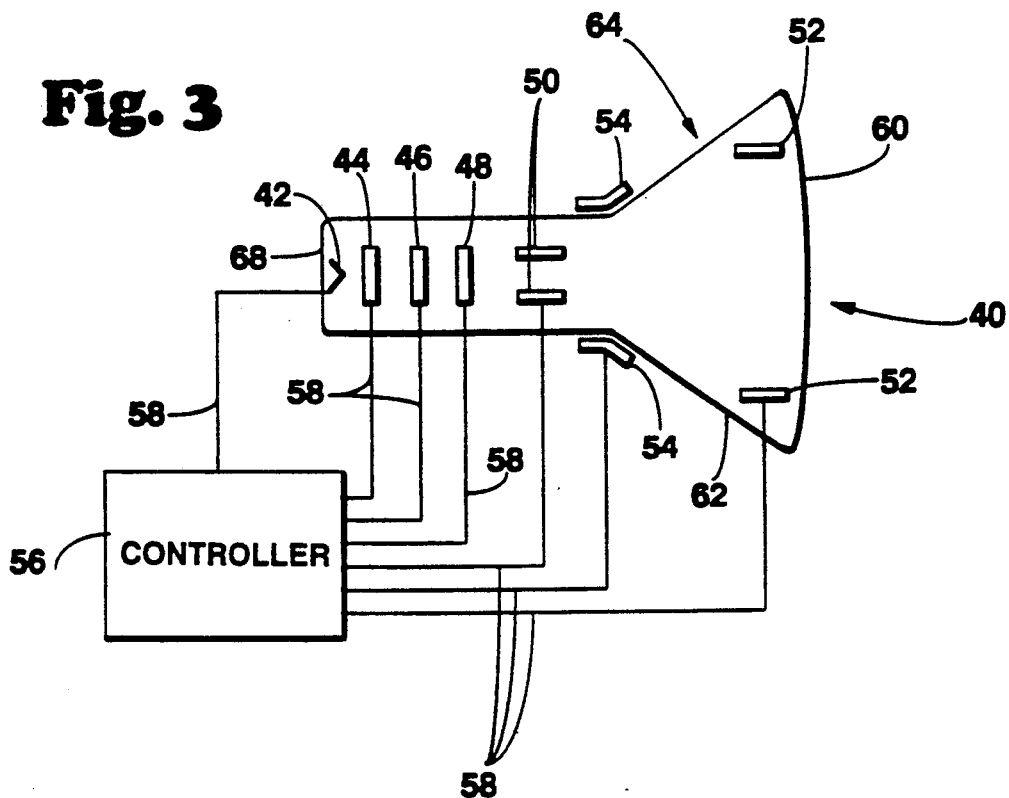
FIG. 3 is diagram of a computer monitor.

A computer system 10 incorporating the present invention is shown in FIG. 1. The computer system 10 has a CPU 20, a keyboard 26 and a monitor 40. Keyboard signal wires 28 connect the keyboard 26 to the CPU 20. Monitor control signal wires 22 connect the monitor 40 with the CPU 20. Power mode signal wires 24 send the power mode signals to the monitor 40 from the CPU 20.

A second embodiment of the computer system 10 incorporating the present invention is shown in FIG. 2. This computer system 10 has a CPU 20, a keyboard 26 and a monitor 40. Keyboard signal wires 28 connect the keyboard 26 to the CPU 20. Monitor control signal wires 30 with encoded power mode signals connect the CPU 20 with the monitor 40.

FIG. 3 shows the elements of a monitor 40 for use in the present invention. The housing 62 of the CRT 64 has a screen 60 and within the housing 62 are the power-consuming elements such as the heating filament 42, modulator grid 44, accelerator grid 46, focusing grid 48, first anode 50, second anode 52 and deflector coils 54. Control Circuitry 56 controls the operation of these elements through control wires 58.

The present invention reduces the power consumption of a computer system by turning the power off to selected elements in the monitor. Thus, the system has two power modes when it is powered-on, a low powered-on mode and a normal powered-on mode. In the preferred embodiment, electrical power is turned off to all of the power-consuming elements except the heating filament 42 when the system is in the low powered-on mode. In this mode, the power to the heating filament 42 remains high, but is reduced slightly. Thus, the system has a normal powered-on mode in which the power-consuming elements are all turned on and a low powered-on mode in which the selected elements are turned off.

In another embodiment of the invention, the power to the heating filament 42 remains the same, even in the low powered-on mode. In still another embodiment, the power to the heating filament 42 is turned off along with the power to the other power-consuming elements of the monitor 40 in the low powered-on mode.

This invention achieves a 65–70% reduction in the power consumption by the computer system. By comparison, powering down the hard drive of a personal computer system may achieve only a 3% reduction in power consumption by the computer system.

Figure 5:
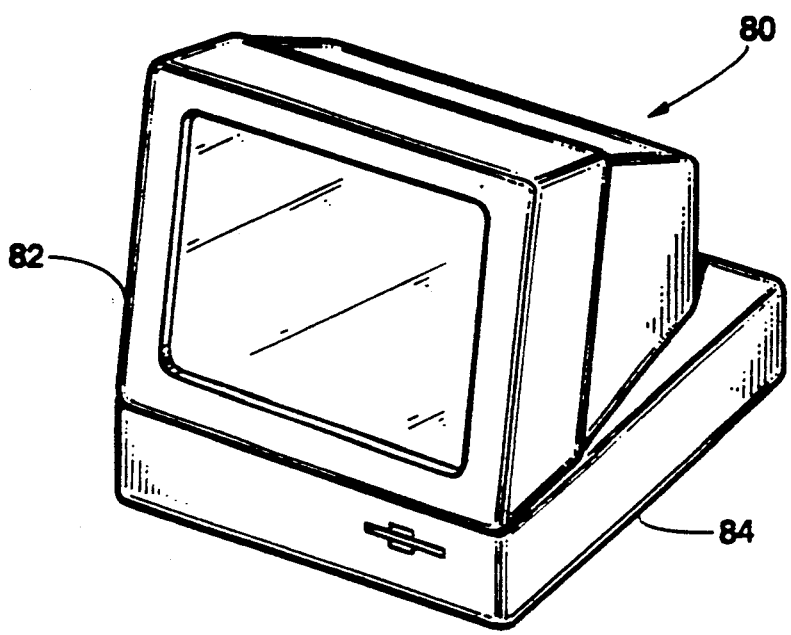
FIG. 5 is a perspective view of a computer system incorporating a captive monitor.

This invention has particular application in a computer system wherein the monitor, or display device, is an integral part of the system, i.e. the display device is "captive" within the system as shown in FIG. 5. Such a captive-monitor computer system may have a computer system 80 with a monitor 82 built onto the CPU housing 84. Many portable computer systems and personal word-processing systems incorporate a captive monitor subsystem without which the system cannot operate. By contrast, a computer system with a non-captive monitor is such that any monitor can be plugged into a monitor jack in the side of the CPU box of the system. Previously, there have been no monitors with power-down features; thus, a captive-monitor system is ideal for the present invention, since the monitor and the CPU must work in special cooperation to power-down the monitor.

In the present invention a signal is sent to the monitor 40 from the CPU system 20 commanding the monitor 40 to power down the selected elements. In the preferred embodiment, this signal is encoded in the monitor control signals 30 in FIG. 2. The monitor control signals 30 include red-green-blue (RGB) video signals and horizontal and vertical sync signals. The sync signals are turned off, or brought to zero, thus signaling the monitor to turn off the selected elements. Control circuitry 56 (FIG. 3) in the monitor 40 detects whether the sync signals are off and then turns off the selected elements through control wires 58 in response thereto. Then when the sync signals are turned back on, the control circuitry 56 turns the selected elements back on.

In the foregoing preferred embodiment, the RGB video signals are not turned off. However, in another embodiment, these signals are used to command the monitor 40 to turn off the heating filament 42 in addition to the other selected power-consuming elements, effectively turning off the entire monitor 40 except for a small circuit in the control circuitry 56 that monitors the monitor control signals 30 in order to turn the monitor 40 back on. Thus, the monitor 40 can detect when the CPU box 20 has been turned off and can put itself into low power mode until the user turns the CPU box 20 back on.

A person skilled in the art will recognize that there are many ways to send the signals for commanding the monitor to turn the selected elements on and off. For example, in one embodiment, the timing of the sync signals may be changed, instead of sending the signals to zero. In another embodiment, separate power mode signal wires 24 (FIG. 1) are used to send the signals. In this embodiment, one wire carries a simple on/off signal. The person skilled in the art will recognize that this is not an all-inclusive list of the ways to send the signals.

Figure 4:
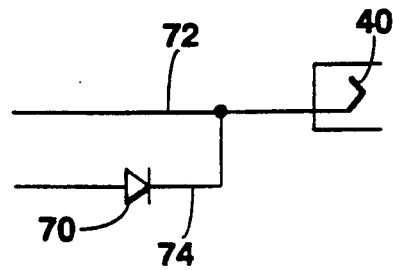
FIG. 4 is a schematic diagram of a circuit for providing alternate voltages to a heating filament according to the present invention.

In the preferred embodiment, the power to the heating filament 42 is slightly reduced. This power reduction adds additional power savings, but does not reduce the temperature of the filament 42 too much, so that the filament 42 can be returned to its normal operating temperature in approximately two seconds. In many monitors the normal operating voltage applied to the filament 42 is 6.3V. In the present invention, the voltage is reduced to approximately 5V. FIG. 4 shows the 6.3V source applied to the filament 42 through wire 72. The 5V source is applied through diode 70 and wire 74 to the filament 42. In this arrangement, when the 6.3V source is turned on, the diode 70 is reversed biased, so the filament 42 receives the 6.3V. When the control circuitry 56 receives the signal to put the monitor 40 in the low power mode, the 6.3V source is turned off, so the diode becomes forward biased and the 5V source is applied to the filament 42. A person skilled in the art will recognize that the 5V source can come from any source. For example, in the embodiment shown in FIG. 1, the 5V can come through the power mode signal wires 24 in a separate wire or as part of the on/off signal. In another embodiment, the 5V source may be a standby source within the power supply or control circuitry 56 of the monitor 40.

What is claimed is:

1. A computer system having a central processing unit comprising:
   a display device having a normal powered-on mode and a low powered-on mode;
   a heating filament disposed within the display device;
   a normal voltage source applied to the heating filament when the display device is in the normal power mode;
   a low voltage source applied to the heating filament when the display device is in the low power mode; and
   means for changing the power mode of the display device between the normal powered-on mode and the low powered-on mode.

2. The computer system of claim 1 wherein the display device is a captive display device.

3. The computer system of claim 1 further comprising:
   means for generating a first signal;
   the means for changing the power mode being capable of changing the power mode in response to the first signal.

4. The computer system of claim 3 wherein the means for changing the power mode is capable of changing the power mode of the display device from the first power mode to the second power mode in response to the first signal.

5. The computer system of claim 4 further comprising:
   a means for generating a second signal;
   the means for changing the power mode being capable of changing the power mode of the display device from the second power mode to the first power mode in response to the second signal.

6. The computer system of claim 5 further comprising:
   an input device capable of generating an input signal; and
   a means for generating a time-out signal after a predetermined period of time has elapsed since the last input signal;
   the means for generating the first signal being capable of generating the first signal in response to the time-out signal.

7. The computer system of claim 6 wherein the means for generating the second signal is capable of generating the second signal in response to the input signal.

8. The computer system of claim 5 further comprising:
   an input device capable of generating an input signal;
   the means for generating the second signal being capable of generating the second signal in response to the input signal.

9. A method for reducing power consumption of a computer system comprising the steps of:
   providing a display device having a normal power consumption mode and a lower power consumption mode; and
   reducing the power to the display device from the normal power consumption mode to the lower power consumption mode by reducing the power to selected elements of the display device;
   wherein said power reducing step includes the additional steps of:
   turning off the power to a first set of power-consuming elements of the display; and
   reducing the power to a second set of power-consuming elements of the display.

10. The method of claim 9 wherein:
    the second set of power-consuming elements includes a heating filament;
    the display device includes a normal voltage source applied to the heating filament when the display device is in the normal power consumption mode; and
    the display device includes a low voltage source applied to the heating filament when the display device is in the lower power consumption mode.

11. The method of claim 9 comprising the further step of generating a first signal, whereby the step of reducing the power is responsive to the first signal.

12. The method of claim 11 comprising the further steps of:
    generating an input signal; and
    generating a time-out signal after a predetermined period of time after the last generated input signal;
    whereby the step of generating the first signal is responsive to the time-out signal.

13. A method of reducing power consumption of a display device having a normal power mode an a low power mode for use with a computer system comprising the steps of:
    receiving a first signal from the computer system; and
    reducing the power consumption of the display device from the normal power mode to the low power mode in response to the first signal by reducing the power to selected elements of the display device.

14. The method of claim 13 comprising the further steps of:
    receiving a second signal from the computer system; and
    increasing the power consumption of the display device from the low power mode to the normal power mode in response to the second signal.

* * * * *